Figure 1:
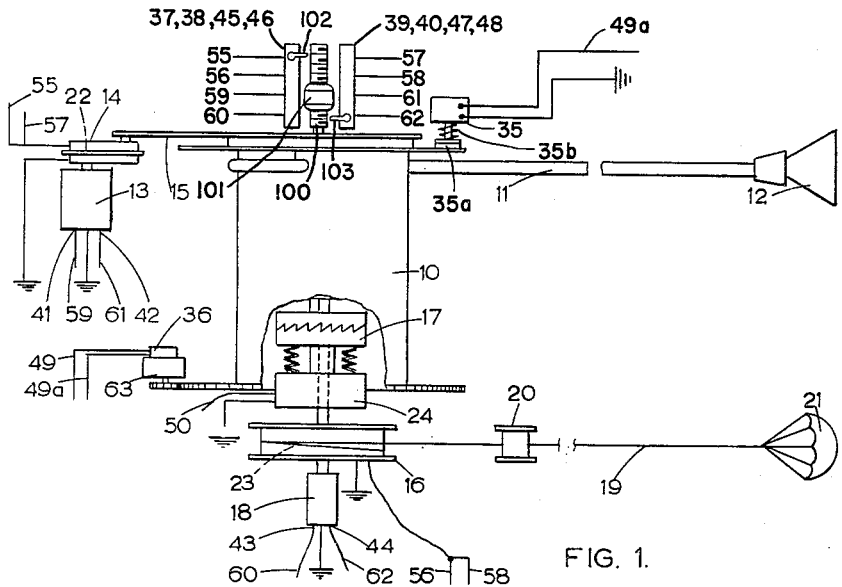

Feb. 28, 1961    A. W. GOODLIFFE ET AL    2,973,163
APPARATUS FOR TRAILING A FLUID-TRANSMITTING
HOSE OR TOW-LINE FROM AN AIRCRAFT
Filed Feb. 3, 1956    2 Sheets-Sheet 1

INVENTORS
ARTHUR W. GOODLIFFE
PETER S. MACGREGOR
PETER G. PROCTER
BY
Watson, Cole, Grindle & Watson
ATTORNEYS Feb. 28, 1961   A. W. GOODLIFFE ET AL   2,973,163
APPARATUS FOR TRAILING A FLUID-TRANSMITTING
HOSE OR TOW-LINE FROM AN AIRCRAFT
Filed Feb. 3, 1956   2 Sheets-Sheet 2

INVENTORS
ARTHUR W. GOODLIFFE
PETER S. MACGREGOR
PETER G. PROCTER
BY
Watson, Cole, Grindle & Watson
ATTORNEYS

United States Patent Office

2,973,163
Patented Feb. 28, 1961

2,973,163

APPARATUS FOR TRAILING A FLUID-TRANS-
MITTING HOSE OR TOW-LINE FROM AN AIR-
CRAFT

Arthur W. Goodliffe, Wimborne, Peter Stevens Mac-
gregor, Upton, Poole, and Peter Gerard Procter, Rose
Green, Bognor Regis, England, assignors to Flight Re-
fueling Incorporated, Danbury, Conn., a corporation
of Delaware Filed Feb. 3, 1956, Ser. No. 563,388

13 Claims. (Cl. 244—3)

This invention relates to apparatus for trailing a fluid-transmitting hose, e.g. for flight-refuelling, or a tow-line, from an aircraft, such apparatus comprising a reel carrying the hose or tow-line and a motor for driving the reel, such motor being reversible or provided with reversing gearing.

When the hose or tow-line is coupled in flight to another aircraft it is desirable that it be free to pay in and out, within limits, and that, to take up any slack and to avoid whip or snatch, a substantially constant tension be applied to it. One method now in use for achieving this purpose is to use the driving motor to apply a steady torque to the reel in the wind-in sense by means of a fluid-drive coupling. With increasingly severe requirements in the matter of maximum flight speed for the intended operation, the magnitude of the required steady torque increases steeply. If this increased torque is being applied to a hose, the situation is aggravated by increasingly severe requirements in the matter of rate of fluid transfer, calling for ever heavier and bulkier hoses. The high steady torque called for in turn calls for a motor of high continuous rating, which besides imposing a severe weight penalty, not only in respect of the motor but also of the fluid-drive coupling and necessary gearing, entails a heavy drain on the electrical services of the aircraft.

An object of this invention is to provide, in apparatus for trailing a hose or tow-line from an aircraft, alternative and better means of applying a steady torque to the reel carrying the hose- or tow-line.

According to this invention, airborne apparatus of the type first herein referred to includes further an auxiliary reel and a motor, reversible or provided with reversing gearing, for driving it, a line carried by the auxiliary reel and terminating in a drogue or equivalent drag-creating device, means for disconnecting each reel from its driving motor and means for coupling the reels together in such a way that as the hose or tow-line pays out the line carried by the auxiliary reel is proportionately reeled in, and conversely.

With the reels so coupled and the motors disengaged, the drag-creating device attached to the line carried by the auxiliary reel applies a substantially constant torque of aerodynamic origin to the principal reel in the sense for reeling in the hose or tow-line, which is free to pay in or out to accommodate relative changes of station in the line of flight of the two aircraft which are coupled together by the hose or tow-line; while both motors may be stopped, or left idling at no load, according to convenience.

In a preferred arrangement the principal and auxiliary reels are coaxial and the means for coupling them comprise a dog- or friction-clutch, the hose or tow-line and the line carried by the auxiliary reel being wound on their respective reels in opposite senses.

Figure 2:
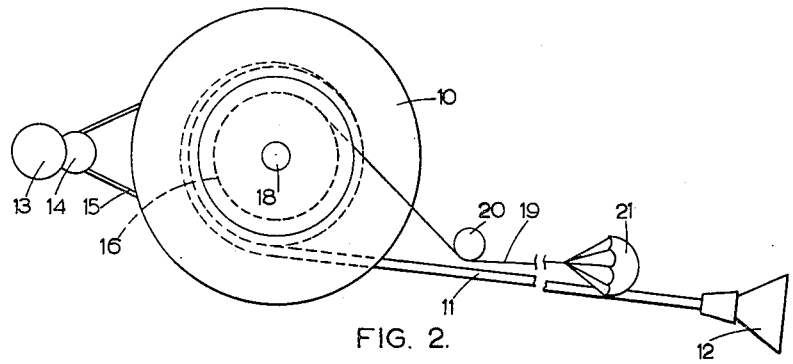
Figure 3:
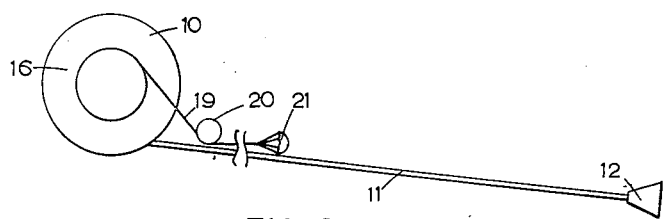
Figure 4:
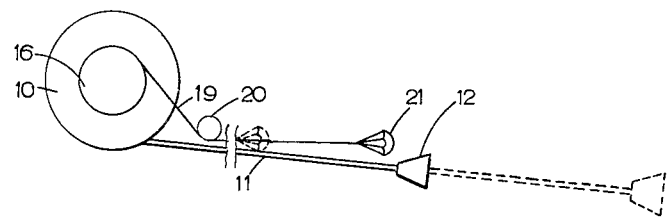

An installation in accordance with the invention is illustrated by way of example in the accompanying entirely schematic drawings, of which, Figure 1 is a view in plan;
Figure 2 is a view in side elevation;
Figures 3 and 4 are views similar to Figure 2, on a reduced scale, illustrating the operation of the installation; and
Figure 5 is a circuit diagram of a control system for the installation.

Referring to Figures 1 to 4 of these drawings, the principal reel 10 carries a hose 11 terminating in a hollow conical drogue 12 in the interior of which is a coupling member, which can be connected in flight to a complementary coupling member carried by another aircraft, without actual manipulation, by simply bringing the coupling members forcibly together. The reel 10 can be driven in either sense by a reversible electric motor 13 through a normally disengaged electromagnetic clutch 22 engageable when excited (see also Figure 5) and reduction gearing enclosed in a housing 14, and through a chain 15.

Figure 5:
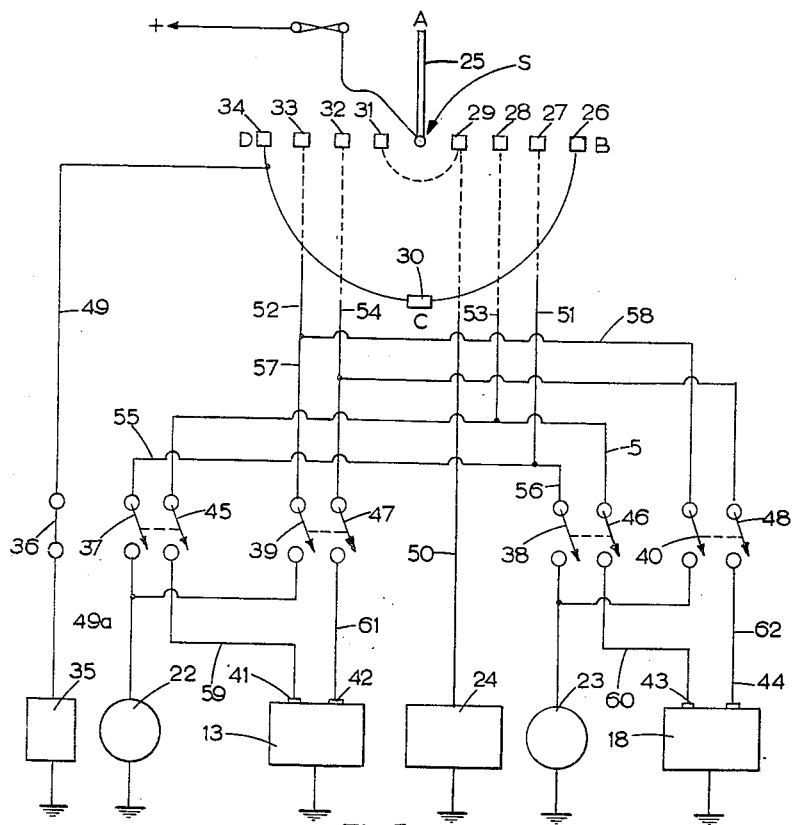

An auxiliary reel 16 coaxial with reel 10 can be coupled to and uncoupled from reel 10 by means of a spring-engaged dog clutch 17 with serrated teeth, disengageable by an electromagnetic actuator 24 when excited, and can be driven in either sense by a reversible electric motor 18 through a normally disengaged electromagnetic clutch 23 engageable when excited and housed within the reel 16 (see also Figure 5). Details of the clutches 22, 23 are not illustrated, as they may be of known type. A line 19, wound on reel 16 in the opposite sense to that in which the hose 11 is wound on reel 10, passes over a jockey pulley 20 and terminates in a drag-creating device, here shown as a parachute 21. The motors 13, 18 are preferably of the constant speed type. Obviously, in the preferred embodiment where the two reels are connected by direct shafting, the hose 11 and line 19 are laid on their respective reels in opposite hand in order to obtain the reciprocal paying-out and winding-in. It is equally obvious that if it were desired to lay the hose and the line on the reels in the same direction or hand, the respective shafting of the reels would have to be geared together to cause them to rotate in opposite directions. Therefore, the applicants do not desire to be limited to any particular structural means for effecting this reciprocal operation of the hose and auxiliary line.

In operation, the reels are initially uncoupled from one another and the hose 11 is payed out, by engaging and running motor 13 in the required sense, to its full trail position, the parachute 21 being at the same time paid out in a similar manner but not to the full extent of line 19 (Figure 3). The motors 13, 18 are then disengaged and the reels 10, 16 coupled together.

Normally, the drag of parachute 21 will be so selected that the reels 10, 16 when coupled together and disengaged from the motors 13, 18 will be approximately in equilibrium under the opposed drags of parachute 21 and of the hose 11 and drogue 12, when trailing freely (i.e. not attached to another aircraft).

When connection has been established with another aircraft by means of the coupling member in the interior of drogue 12, the hose 11 is free to pay in and out, within a range (determined by the length of line 19 or/and appropriate stop means) indicated by dotted lines in Figure 4, under the tension developed by the substantially constant torque applied to the coupled reels 10, 16 by the drag of the parachute 21 acting through the line 19.

Owing to its own weight and the weight of the drogue 12 and of the coupling member inside it, the hose 11 trails with a certain amount of droop, whereas the parachute 21 and line 19 are relatively light and consequently the line 19 trails almost horizontally; and the resulting vertical separation between the drogue 12 and parachute 21 on the position shown in Figure 4 is sufficient to ensure that the former is clear of the region of disturbed air in the negihbourhood of the latter.

On release of the other aircraft, which may be effected in a known manner, the reels 10, 16 are uncoupled from one another and the motors 13, 18 engaged to wind in the hose 11 and line 19.

Figure 5 is a circuit diagram of one form of system for controlling the motors 13, 18, clutches 22, 23 and electromagnetic actuator 24. The circuit is of the earth-return single-pole type and comprises a manual switch S having four positions, viz. $A=$ "Off", $B=$ "Trail", $C=$ "Operations", $D=$ "Wind". In position A the movable contact member 25 of this switch isolates the whole circuit; in position B it closes on four fixed contacts 26, 27, 28, 29; in position C it closes on one fixed contact 30; and in position D it closes on four other fixed contacts 31, 32, 33, 34. Contacts 26, 30 and 34 are interconnected and feed an electromagnetic actuator 35, through a connector 49, 49a containing a normally closed limit switch 36 actuated by an overspeed governor 63 driven by the reel 10 so as to open when an overspeed occurs. Actuator 35, when excited, releases a main reel brake 35a normally applied by means of a spring 35b. This brake and the overspeed governor are not in themselves part of this invention and are therefore not illustrated in detail.

Contacts 29, 31 are interconnected and through a connector 50 feed the actuator 24, which, when excited, disengages the reel-coupling dog-clutch 17.

Contact 27 feeds the electromagnetic clutches 22 and 23 through a connector 51, and respectively through connectors 55 and 56 containing limit switches 37 and 38; and contact 33 feeds the same two clutches through a connector 52, and respectively through connectors 57 and 58 containing limit switches 39 and 40.

The motors 13, 18 have feed terminals 41, 43 for running in the paying-out or "trail" sense and other terminals 42, 44, respectively, for running in the "wind-in" sense. Terminals 41 and 43 are fed from contact 28 through a connector 53 and respectively through connectors 59 and 60 containing limit switches 45 and 46; and terminals 42 and 44 are fed from contact 32 through a connector 54 and respectively through connectors 61 and 62 containing limit switches 47 and 48. The limit switches are operated by the reel 10, e.g. by means of lead-screw and nut mechanism, in such a way that, when the hose 11 and line 19 are payed-out to the operating or "full-trail" position, the switches 37, 38, 45, 46 are opened, and when the hose 11 and line 19 are fully wound-in the switches 39, 40, 47, 48 are opened.

This operational expedient is so common in the art that it hardly needs illustration and description in the present specification; however, the lead screw and nut arrangement can very well be an obvious adaptation of the similar installation shown at the left-hand central portion of Figure 16 of the patent to Cobham et al. No. 2,692,102, issued October 19, 1954. Such an arrangement is shown at the top of Figure 1 of the drawings where the assembled limit switch contacts 37, 38, 45 and 46 are grouped at one side of a lead screw 100 appropriately connected with the shaft of the reel 10 and the switch contacts 39, 40, 47 and 48 are grouped at the opposite side of the lead screw. Conductors 55, 56, 59 and 60 lead into the first limit switch assembly and conductors 57, 58, 61 and 62 lead into the opposite assembly.

Pivoted switch operating levers 102 and 103 extend respectively from the switch assemblies and a travelling nut 101 has bevelled operating surfaces adapted to contact and move the levers 102 and 103 to operate the limit switches at the appropriate points during the paying-out or winding-in movements of the drum or reel 10.

The sequence of operations is as follows: with the hose 11 and line 19 wound-in, the movable contact 25 is placed in position B, thus closing the circuits through contacts 26, 27, 28, 29 and switches 36, 37, 38, 45, 46, thereby engaging clutches 22, 23 to connect the motors 13, 18 to the reels 10, 16, respectively, and excite both motors in the paying-out sense, and at the same time exciting the actuator 24 to disengage the reel-coupling clutch 17, and exciting the actuator 35 to release the reel brake. When the hose 11 has reached the "full-trail" or operative position, the limit switches 37, 38, 45, 46 are opened, thereby disengaging the clutches 22, 23 and stopping the motors 13, 18.

The contact 25 is then moved to position C, thereby isolating all the circuits except that feeding the actuator 35 through switch 36 so that the reel brake is kept "off". Both motors therefore remain stopped and disengaged from their reels, while the isolation of actuator 24 allows the dog-clutch 17 to be engaged by its spring-loading and couple the two reels 10 and 16 together. The extension of hose 11 is then controlled solely by the parachute 21 as previously described.

On completion of a re-fuelling operation, the contact 25 is moved to position D, thus closing the circuits of the motors 13, 18 through their reversing terminals 42, 44 and limit switches 47, 48 and exciting the clutches 22, 23 through the limit switches 39, 40 to re-engage these clutches and connect the reels 10, 16 to their motors for winding-in, and at the same time re-exciting the actuator 24 through contact 31 to disengage the clutch 17 and uncouple the reels 10, 16. On reaching the fully wound-in position the reel 10 opens the limit switches 39, 40, 47, 48, thus disengaging the clutches 22, 23 and stopping both motors 13, 18.

The contact 25 may now be returned to the "off" position A, thus breaking the circuit through switch 36 to actuator 35 and allowing the reel-brake to return to braking position.

We claim:

1. Airborne apparatus for trailing a flexible element, such as a hose or tow-line, from an aircraft, said apparatus comprising a main reel carrying such flexible element, an auxiliary reel, an auxiliary line carried by said auxiliary reel, a drag-creating device mounted on the end of said auxiliary line, means for operatively coupling the main reel to the auxiliary reel for such relative rotation as will cause the main reel to wind in the flexible element at the same time the auxiliary reel pays out the auxiliary line, and conversely, taking into consideration the directions in which the flexible element and the line are laid upon the respective reels, independent motor means for driving each of said main and auxiliary reels in either sense, and controllable clutch means for connecting and disconnecting each of said reels with and from its motor means.

2. Apparatus as claimed in claim 1, including automatic means embodied in said apparatus and operatively connected with said clutch means to actuate the latter to cause them to disengage both said reels from their driving motor means when said flexible element has reached a predetermined extension.

3. Apparatus as claimed in claim 2, in which said automatic means includes limit switches, and there are provided electrical circuits connecting said automatic means to said clutch means, and means operatively connected with said main reel for actuating said limit switch means.

4. Apparatus as claimed in claim 1, including means embodied in said apparatus and operatively connected with said clutch means to actuate the latter for disengaging automatically both said reels from their driving motor means when said flexible element is fully wound-in.

5. Apparatus as claimed in claim 4 in which said automatic means includes limit switches, and there are provided electrical circuits connecting said automatic means to said clutch means, and means operatively connected with said main reel for actuating said limit switch means.

6. Apparatus as claimed in claim 1, in which the main and auxiliary reels are coaxial and when coupled by said coupling means rotate in the same sense, said auxiliary line being wrapped on said auxiliary reel in the opposite sense to that in which said flexible element is wrapped on said main reel.

7. Apparatus as claimed in claim 1, in which the reel-coupling means comprise a normally engaged dog-clutch, and an electromagnetic actuator operatively connected with said clutch for disengaging said clutch.

8. Apparatus as claimed in claim 1, including control means operatively connected with said coupling means and said clutch means to ensure that both said reels are disconnected from their driving motor means when they are coupled together.

9. Airborne apparatus for trailing a flexible element, such as a hose or tow-line, from an aircraft, said apparatus comprising within its confines and operatively connected together for performing their prescribed functions, the following: a main reel carrying such flexible element, motor means for driving said reel in either sense, a normally disengaged clutch for operatively connecting said motor means to said main reel, an electrical circuit controlling said clutch and operative when closed to cause said clutch to engage, an auxiliary reel, an auxiliary line carried by said auxiliary reel, a drag-creating device mounted on the end of said auxiliary line, auxiliary motor means for driving said auxiliary reel in either sense, a normally disengaged clutch operatively connecting said auxiliary motor means to said auxiliary reel, an electric circuit controlling said last-named clutch and operative when closed to cause said last-named clutch to engage, a disengageable coupling device, which normally couples said auxiliary reel to said main reel, said reels being so arranged and wound that when they are so coupled the auxiliary line is payed-out when the said flexible element is wound-in and conversely, an electric circuit controlling said coupling device and operative when closed to cause said coupling device to disengage, and a multi-position switch means coupled in said circuits, said switch means having positions for either opening or closing all of said circuits simultaneously, so that the two said main and auxiliary reels can only be connected to their respective motor means when said coupling device is disengaged.

10. Airborne apparatus for trailing a flexible element, such as a hose or tow-line, from an aircraft, said apparatus comprising within its confines and operatively connected together for performing their prescribed functions, the following: a main reel carrying said flexible element, a reversible electric motor, a magnetic clutch for coupling said motor to said main reel when excited, an auxiliary reel coaxial with the main reel, an auxiliary line carried by said auxiliary reel, a drag-creating device mounted on the end of said auxiliary line, said main and auxiliary reels being wound in opposite senses, an auxiliary reversible electric motor, an auxiliary magnetic clutch for coupling said auxiliary motor to said auxiliary reel when excited, a normally spring-engaged dog-clutch for coupling said reels together, an electromagnetic actuator for disengaging said dog-clutch when excited, electric circuits for exciting each of said motors for rotation in forward and reverse senses, other electric circuits for exciting said magnetic clutches and said actuator respectively, and manually controllable switch means controlling said circuits and having a first position in which the motor-exciting circuits for forward rotation and the clutch- and actuator-exciting circuits are concurrently closed, a second position in which the motor-exciting circuits for reverse rotation and the clutch- and actuator-exciting circuits are concurrently closed, and a third position in which all of said circuits are opened.

11. Airborne apparatus as claimed in claim 10, including a normally spring-applied main-reel-brake, an electromagnetic actuator for releasing said brake when excited and an electric circuit for exciting said last-named actuator, such circuit being controlled by said switch means, which in said first and second positions also closes said last-named circuit, in said third position also opens said last-named circuit, and in a fourth position closes said last-named circuit only.

12. Apparatus as claimed in claim 11, including a limit switch in the circuit for exciting the reel-brake-releasing actuator, and an overspeed governor driven by the main reel and adapted to open said limit switch when an overspeed occurs and thereby enable said reel-brake to be spring-applied.

13. Apparatus as claimed in claim 10, including further a first set of limit switches actuated by said main reel and operative to open the circuits exciting said clutches and said motors when the extension of said flexible element attains a predetermined upper value, and a second set of limit switches actuated by said main reel and operative to open the circuits exciting said clutches and said motors when said flexible element is fully wound-in.

References Cited in the file of this patent

UNITED STATES PATENTS 2,721,716    Beadle                Oct. 25, 1955

FOREIGN PATENTS 462,818    Great Britain          Mar. 16, 1937
714,923    Great Britain          Sept. 8, 1954